United States Patent
Takaishi

(10) Patent No.: US 9,837,114 B1
(45) Date of Patent: Dec. 5, 2017

(54) DISK DEVICE AND METHOD FOR MANUFACTURING DISK DEVICE

(71) Applicant: KABUSHIKI KAISHA TOSHIBA, Tokyo (JP)

(72) Inventor: Kazuhiko Takaishi, Machida Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/449,487

(22) Filed: Mar. 3, 2017

(30) Foreign Application Priority Data

Sep. 12, 2016 (JP) ................. 2016-177867

(51) Int. Cl.
  *G11B 7/00* (2006.01)
  *G11B 21/02* (2006.01)
  *G11B 20/10* (2006.01)
  *G11B 5/596* (2006.01)

(52) U.S. Cl.
  CPC .... *G11B 20/10027* (2013.01); *G11B 5/59672* (2013.01)

(58) Field of Classification Search
  CPC ..... G11B 27/36; G11B 5/012; G11B 2220/20; G11B 2220/90; G11B 5/09; G11B 5/6005; G11B 5/59633; G11B 5/54; G11B 5/552; G11B 5/596; G11B 7/005; G11B 7/0945; G11B 7/095; G11B 7/00; G11B 20/10009; G11B 19/26; G11B 21/1217
  USPC ..... 360/31, 39, 75, 78.05, 77.04; 369/44.35, 369/44.29, 47.25, 47.36, 124.1
  See application file for complete search history.

(56) References Cited

U.S. PATENT DOCUMENTS

| | | |
|---|---|---|
| 6,693,763 B2 | 2/2004 | Bi et al. |
| 6,987,636 B1 | 1/2006 | Chue et al. |
| 7,009,804 B2 | 3/2006 | Sharma et al. |
| 7,149,044 B1 | 12/2006 | Chen et al. |
| 7,154,689 B1 | 12/2006 | Shepherd et al. |
| 7,167,333 B1 | 1/2007 | Liikanen et al. |
| 7,433,143 B1 | 10/2008 | Ying et al. |
| 7,869,157 B2 * | 1/2011 | Nagashima .......... G11B 5/5552 360/77.04 |

FOREIGN PATENT DOCUMENTS

JP 2001-338477 12/2001

\* cited by examiner

*Primary Examiner* — Nabil Hindi
(74) *Attorney, Agent, or Firm* — Patterson & Sheridan, LLP

(57) ABSTRACT

A method for manufacturing a disk device includes the steps of measuring a first gain of a control signal of a fine motion actuator while positioning a head to a first radial position of a disk medium using a coarse motion actuator but not the fine motion actuator, based on an auxiliary servo pattern recorded on the disk medium, measuring a second gain of a control signal of the fine motion actuator while positioning the head to a second radial position of the disk medium using the coarse motion actuator but not the fine motion actuator, based on the auxiliary servo pattern recorded on the disk medium, and determining gain correction values which are to be applied to a control signal for the fine motion actuator while performing servo pattern writing on the disk medium, based on the first and second gains.

20 Claims, 12 Drawing Sheets

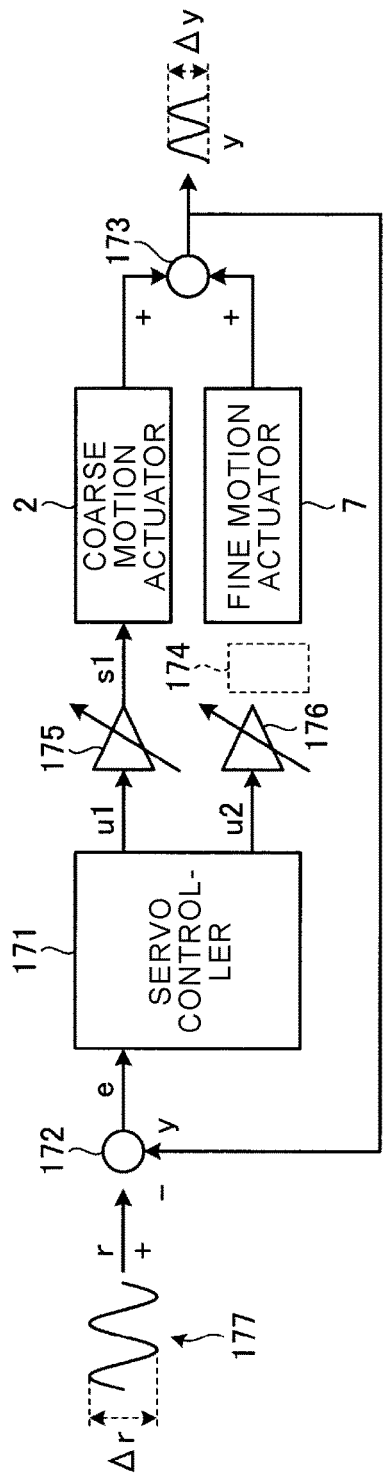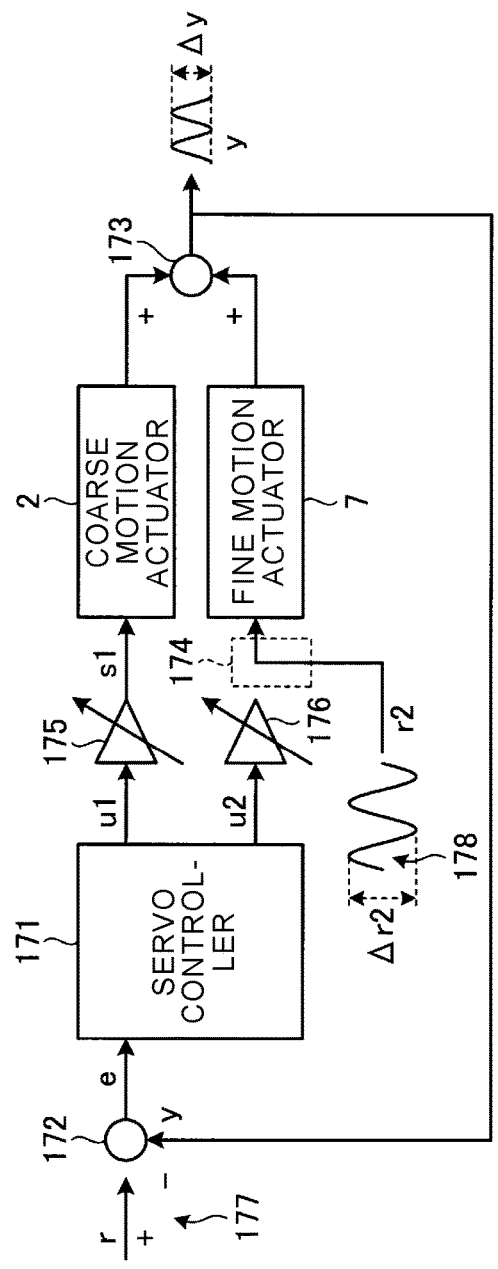
FIG. 6A
FIG. 6B

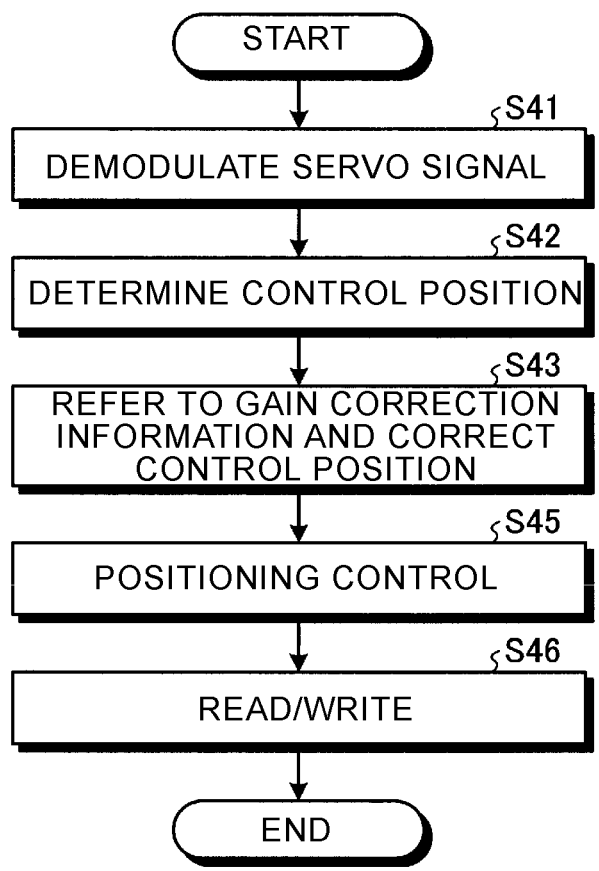

DISK DEVICE AND METHOD FOR MANUFACTURING DISK DEVICE

CROSS-REFERENCE TO RELATED APPLICATION

This application is based upon and claims the benefit of priority from Japanese Patent Application No. 2016-177867, filed Sep. 12, 2016, the entire contents of which are incorporated herein by reference.

FIELD

Embodiments disclosed herein relate to a disk device and a method for manufacturing the same.

BACKGROUND

In a disk device, a track is defined by a servo pattern written on a disk medium. Therefore, the servo pattern recorded on the disk medium will determine the uniformity of the track width of each track.

DESCRIPTION OF THE DRAWINGS

FIGS. 6A and 6B are views each of which illustrates a control operation in the measurement process in the embodiment.

FIG. 12 is a flowchart illustrating the read/write process in the modification of the embodiment.

DETAILED DESCRIPTION

Embodiments provide a disk device that is capable of improving uniformity of the track width of each track of a magnetic recording medium that is defined by a servo pattern.

According to one embodiment, there is provided a method for manufacturing a disk device. The method includes the steps of measuring a first gain of a control signal of a fine motion actuator while positioning a head to a first radial position of a disk medium using a coarse motion actuator but not the fine motion actuator, based on an auxiliary servo pattern recorded on the disk medium, measuring a second gain of a control signal of the fine motion actuator while positioning the head to a second radial position of the disk medium using the coarse motion actuator but not the fine motion actuator, based on the auxiliary servo pattern recorded on the disk medium, and determining gain correction values which are to be applied to a control signal for the fine motion actuator while performing servo pattern writing on the disk medium, based on the first and second gains.

Hereinafter, a disk device manufacturing method and a disk device according to an embodiment will be described in detail with reference to the accompanying drawings. However, the present disclosure is not limited to the embodiment.

Embodiment

Figure 1:
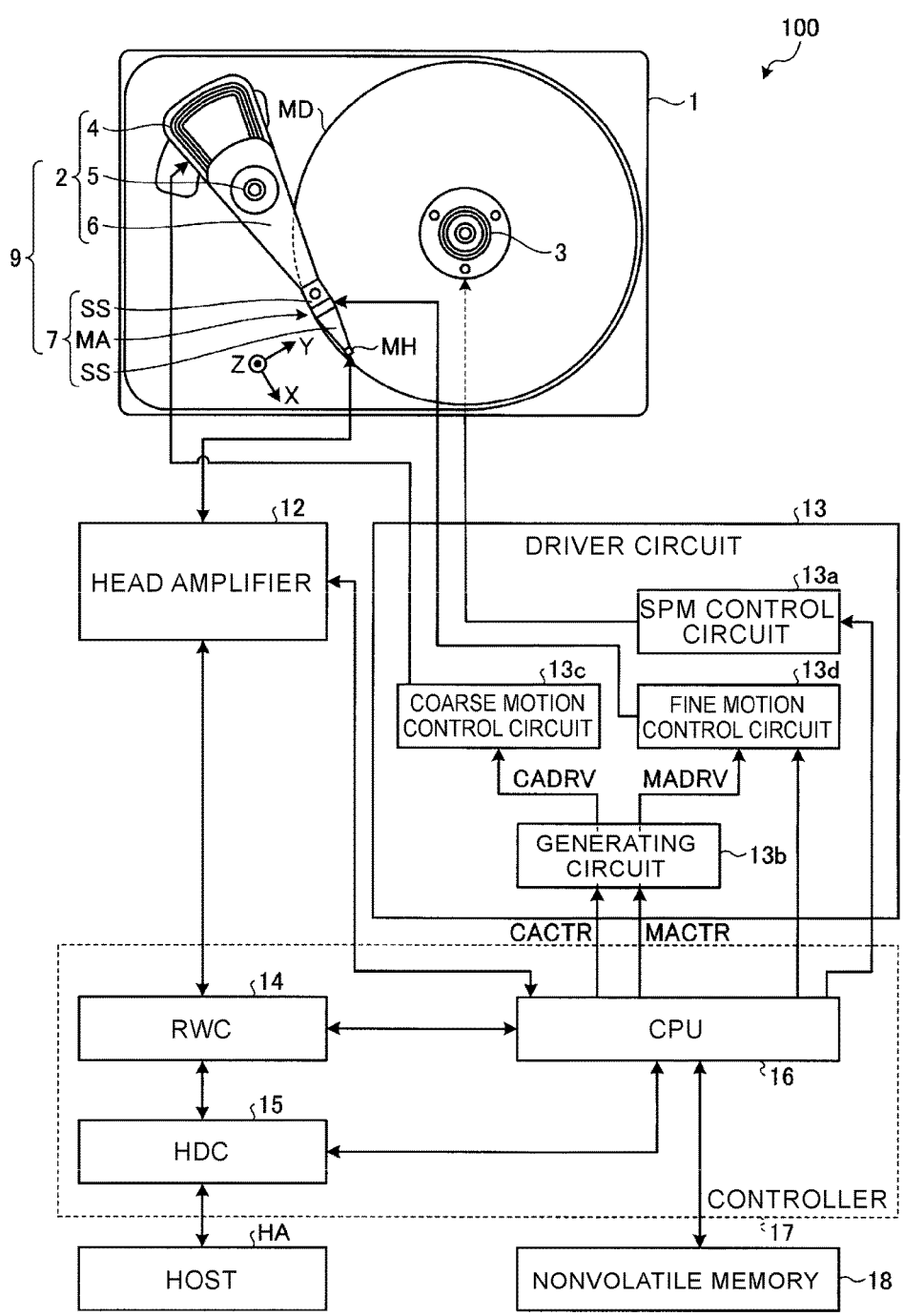
FIG. 1 is a view illustrating a configuration of a disk device according to an embodiment.

A disk device 100 according to an embodiment will be described with reference to FIG. 1. FIG. 1 is a view illustrating a schematic configuration of the disk device 100. In some cases, a disk device may adopt a dual stage actuator (DSA) technology that drives a head MH by a coarse motion actuator 2 and a fine motion actuator 7.

For example, as illustrated in FIG. 1, the disk device 100 includes a case 1, a plurality of disk media MD, a spindle motor (SPM) 3, a coarse motion actuator 2, a plurality of fine motion actuators 7, a plurality of heads MH, a head amplifier 12, a read/write channel (RWC) 14, a hard disk controller (HDC) 15, a processor (CPU) 16, a nonvolatile memory 18, and a drive circuit 13.

The plurality of disk media MD are rotatably supported on the case 1 via the SPM 3. The SPM 3 is rotationally driven by the drive circuit 13. The plurality of heads MH is provided to correspond to the front surfaces (recording surfaces) and the rear surfaces (recording surfaces) of the plurality of the disk media MD, respectively. Each head MH is placed to face the front surface or the rear surface of a disk medium MD.

The head MH is moved on the disk medium MD via the coarse motion actuator 2 and the fine motion actuators 7. The coarse motion actuator 2 and the fine motion actuators 7 are driven by the drive circuit 13. The coarse motion actuator 2 includes a voice coil motor (VCM) 4, a rotary shaft 5, and a carriage arm 6. The VCM 4 includes a magnet and a voice coil, and functions as the driving element in the coarse motion actuator 2. A portion of the magnet is attached to the case 1. The coarse motion actuator 2 coarsely moves the carriage arm 6, the fine motion actuator 7, and the head MH by an electromagnetic force exerted by the magnet and the voice coil. The fine motion actuator 7 includes a suspension SS and an extendable member MA. The suspension SS holds the head MH. The extendable member MA includes a piezoelectric element, and functions as the driving element in the fine motion actuator 7. The fine motion actuator 7 finely moves the head MH by a force mechanically exerted to the suspension SS from the extendable member MA.

The head MH includes a write head used for writing data to the disk medium MD and a read head used for reading data from the disk medium MD.

The head amplifier 12 supplies a write signal (current) according to write data input from the RWC 14 to the head MH (write head). In addition, the head amplifier 12 amplifies a read signal output from the head MH (read head) and transmits the amplified read signal to the RWC 14. The head amplifier 12 may include an integrated circuit of one chip. A package of the head amplifier 12 may be mounted on, for example, a side surface of the carriage arm 6.

The RWC 14 is a signal processing circuit. The RWC 14 encodes (e.g., by code modulation) write data input from the HDC 15 and outputs the encoded write data to the head amplifier 12. In addition, the RWC 14 decodes (e.g., by code demodulation) read data from a read signal transmitted from the head amplifier 12 and outputs the decoded read data to the HDC 15.

The HDC 15 performs a data transmission/reception control or the like that is performed between the HDC and the host HA via an I/F bus. The HDC 15 includes a host interface (host I/F) circuit (not illustrated).

The CPU 16 performs the overall control of the disk device 100 according to firmware stored in, for example, the nonvolatile memory 18 or the disk medium MD. The firmware includes initial firmware initially executed when starting the disk device 100 and control firmware used in a normal operation of the disk device 100. According to the firmware, the CPU 16 may perform various control processes such as a control process of read or write by the head MH and a servo control process that controls the position of the head MH on the recording surface of the disk medium MD.

In addition, a hardware configuration including the RWC 14, the HDC 15, and the CPU 16 may be considered as a controller 17. The controller 17 may include an integrated circuit of one chip (system-on-chip). The package of the controller 17 may be arranged on a printed board outside the case 1.

The nonvolatile memory 18 is connected to the CPU 16 of the controller 17, and is rewritable by the CPU 16.

The drive circuit 13 drives the SPM 3, the coarse motion actuator 2, and the fine motion actuator 7 according to a control by the controller 17 (the CPU 16). The drive circuit 13 may include an integrated circuit of one chip. The package of the drive circuit 13 may be arranged on the printed board outside the case 1.

The drive circuit 13 includes an SPM control circuit 13a, a control signal generating circuit 13b, a coarse motion control circuit 13c, and a fine motion control circuit 13d. According to a control signal received from the CPU 16, the SPM control circuit 13a generates a driving signal (a driving voltage or a driving current), and supplies the driving signal to the SPM 3. This causes the SPM 3 to rotationally drive the plurality of disk media MD.

For example, the controller 17 (the CPU 16) may generate a position signal y (see FIG. 6A) by demodulating a head signal that is read from an auxiliary servo pattern of the disk medium MD via the head MH and received through the head amplifier 12. The controller 17 may generate a target position signal r (see FIG. 6A) of the head MH, and calculate a difference between the target position signal r and the position signal y to obtain a calculation result as a position error e. In the calculation of the difference between the target position signal r and the position signal y, for example, the position signal y may be subtracted from the target position signal r. The controller 17 may correct each of the coarse motion control position and the fine motion control position of the head MH corresponding to the target position signal r according to the position error e. The controller 17 may correct each of the coarse motion control position and the fine motion control position of the head MH such that the position error e comes close to zero. The controller 17 generates a control signal CACTR according to the coarse motion control position of the head MH after the correction, and generates a control signal MACTR according to the fine motion control position of the head MH after the correction.

The control signal generating circuit 13b receives the control signal CACTR related to the coarse motion control position of the head MH from the CPU 16. Based on the control signal CACTR, the control signal generating circuit 13b generates a coarse motion control signal CADRV, and supplies the coarse motion control signal CADRV to the coarse motion control circuit 13c. In addition, the control signal generating circuit 13b receives the control signal MACTR related to the fine motion control position of the head MH from the CPU 16. Based on the control signal MACTR, the control signal generating circuit 13b generates a fine motion control signal MADRV, and supplies the fine motion control signal MADRV to the fine motion control circuit 13d.

According to the coarse motion control signal CADRV, the coarse motion control circuit 13c generates a driving signal (a driving voltage or a driving current), and supplies the driving signal to the coarse motion actuator 2 (the VCM 4). This causes the coarse motion actuator 2 (the VCM 4) to coarsely move the head MH.

According to the fine motion control signal MADRV, the fine motion control circuit 13d generates a driving signal (a driving voltage or a driving current), and supplies the driving signal to the fine motion actuator 7 (the extendable member MA). This causes the fine motion actuator 7 (the extendable member MA) to finely move the head MH.

That is, the CPU 16 controls the drive circuit 13 such that the head MH is subjected to a positioning control in two steps of a coarse motion by the coarse motion actuator 2 and a fine motion by the fine motion actuator 7. In addition, a hardware configuration including the coarse motion actuator 2 and the fine motion actuator 7 may be considered as an actuator 9.

Figure 2A:
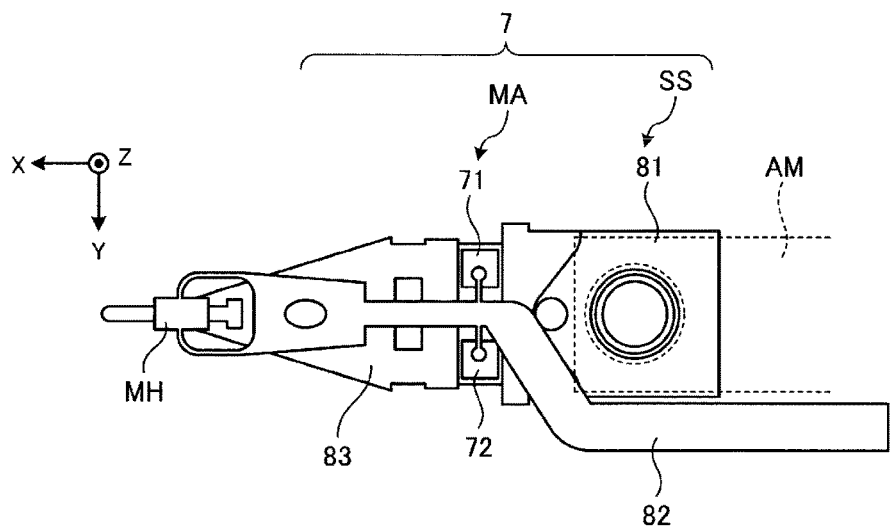
FIGS. 2A and 2B are views illustrating a configuration example of a fine motion actuator and a head in the embodiment.

In the coarse motion actuator 2, the carriage arm 6 includes a carriage mechanically connected to the VCM 4 and a plurality of arms AM extending from the carriage (see FIG. 2A). Each fine motion actuator 7 is supported on one of the arms AM from a +Z side (−Z side), and moves the head MH in a ±Y direction (the radial direction of the magnetic disk MD) with respect to the recording surface at the −Z side (+Z side) of the disk medium MD. The fine motion actuator 7 (the extendable member MA) finely moves the head MH.

A specific mounting form of the extendable member MA is, for example, as illustrated in FIG. 2A. FIG. 2A is a plan view illustrating a configuration example of a fine motion actuator 7 and a head MH. The extendable member MA includes a first member 71 and a second member 72. The suspension SS includes a base plate 81, a flexure 82, and a load beam 83. Each of the first member 71 and the second member 72 is arranged between the base plate 81 and the load beam 83. The first member 71 and the second member 72 may be arranged at the opposite sides with the flexure 82 as a center.

Figure 2B:
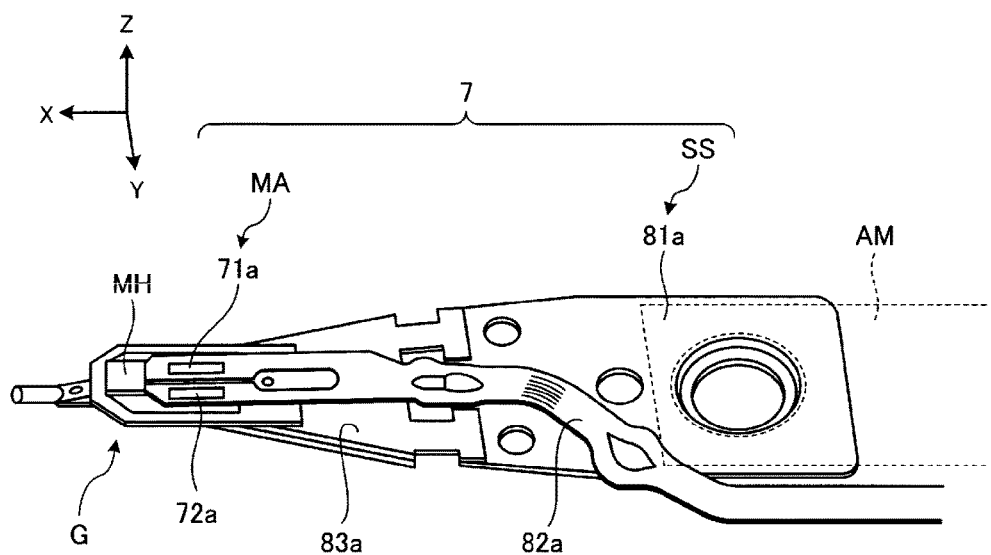

Alternatively, a specific mounting form of the extendable member MA may be, for example, as illustrated in FIG. 2B. FIG. 2B is a perspective view illustrating another configuration example of the fine motion actuator 7 and the head MH. The extendable member MA includes a first member 71a and a second member 72a. The suspension SS includes a base plate 81a, a flexure 82a, and a load beam 83a. Each of the first member 71a and the second member 72a is arranged between the head MH and the load beam 83a in a gimbal portion G at the tip end side of the flexure 82a. The first member 71a and the second member 72a may be arranged at the opposite sides with the flexure 82a as a center.

Each fine motion actuator 7 illustrated in FIG. 2A or FIG. 2B finely moves the head MH as follows. In the fine motion actuator 7, each of the first member 71 or 71a and the second member 72 or 72a receives a driving signal (a driving voltage or a driving current) from the drive circuit 13 via the flexure 82 or 82a so as to generate a mechanical force. For example, when the first member 71 or 71a extends in the X direction (generates a force in the +X direction) and the second member 72 or 72a is contracted in the X direction (generates a force in the −X direction), the extendable member MA in the fine motion actuator 7 finely moves the head MH in the +Y direction. When the first member 71 or 71a is contracted in the X direction (generates a force in the −X direction) and the second member 72 or 72a extends in the X direction (generates a force in the +X direction), the extendable member MA in the fine motion actuator 7 finely moves the head MH in the −Y direction.

Figure 3:
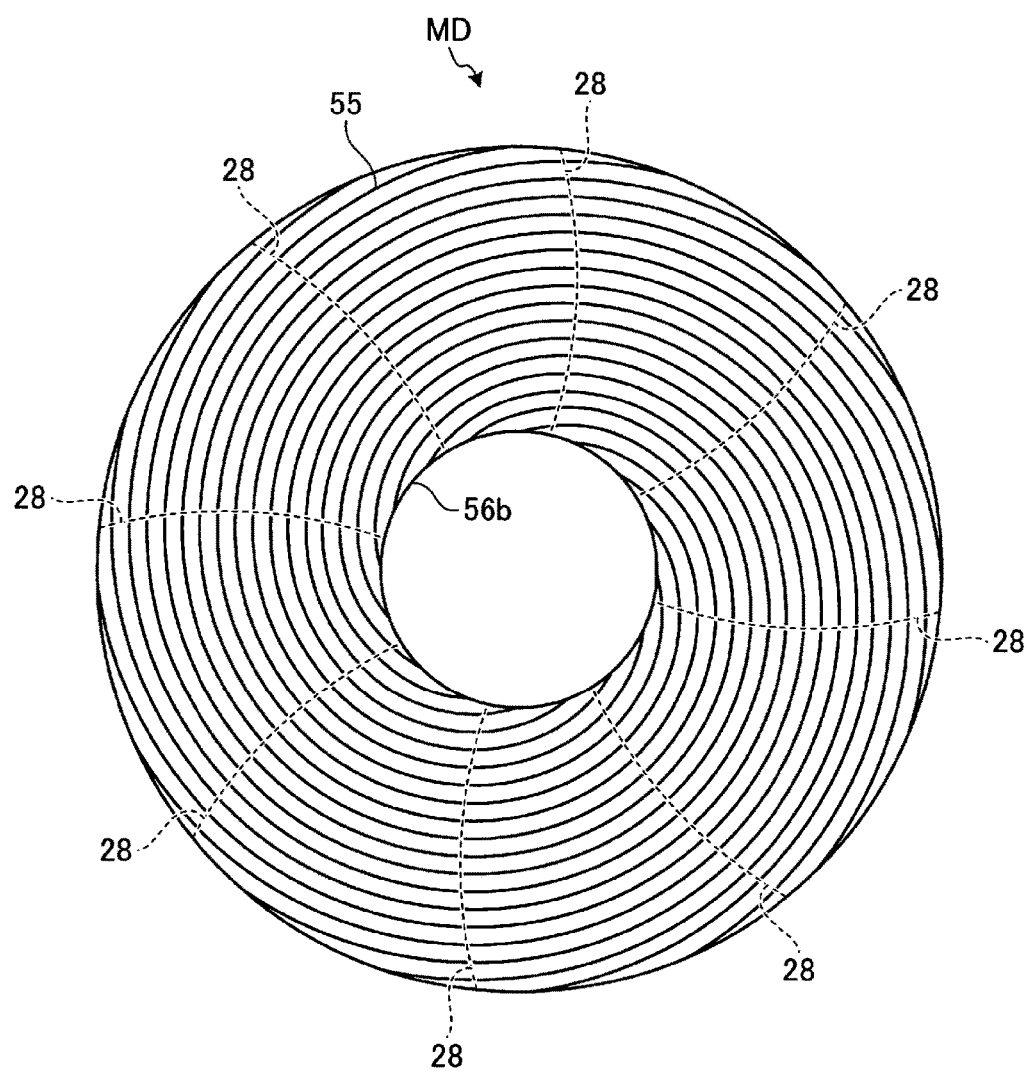
FIG. 3 is a view illustrating a configuration example of an auxiliary servo pattern in the embodiment.

Next, an auxiliary servo pattern will be described with reference to FIG. 3. FIG. 3 is a view illustrating a configuration example of an auxiliary servo pattern. As a method of recording a servo pattern on a disk medium MD in the disk device 100, single-plate STW (also referred to as "media stack STW" or the like) or self servo write (hereinafter, "SSW") has been known. For example, on the front and rear surfaces of the disk medium MD, an auxiliary servo pattern (e.g., a spiral pattern 55) serving as a reference for recording a servo pattern is recorded in advance by a servo track writer (hereinafter, "STW") or the like. In the SSW, the disk medium MD is transferred from the STW to the disk device 100, and a servo pattern 28 may be recorded on the disk medium MD with reference to the auxiliary servo pattern (e.g., the spiral pattern 55). As illustrated by solid lines in FIG. 3, the spiral pattern 55 is recorded in a spiral shape on the disk medium MD. For example, the spiral pattern 55 may be formed, for example, by periodically and repeatedly recording a burst pattern and a synchronization pattern at a constant speed from the inner circumference to the outer circumference of the disk medium MD. The precision of a track width of a servo pattern in the SSW using the spiral pattern 55 depends on the variation of the inclination of the spiral pattern 55 serving as a reference, with respect to the circumferential direction of the disk medium MD. The inclination of the spiral pattern 55 is likely to vary for each head MH and for each unit of the disk device 100 equipped with the disk medium MD due to the variation of the moving speed of the STW or the like when the spiral pattern 55 is recorded in the disk medium MD.

Each track width in the radial direction of the disk medium MD may be determined depending on a feeding pitch of the head MH while the servo pattern 28 is recorded on the disk medium MD in the manufacturing process of the disk device 100. As a method of adjusting the track width in the SSW using a spiral pattern 55, the following first to fifth methods are found.

In the first method, the track width is adjusted according to a radial position by shifting the position of a detection window of a spiral pattern 55 by using a previously obtained correction value (a fixed value) for each radial position to adjust a position where a servo pattern 28 (see dotted lines in FIG. 3) is written. In the first method, because the correction value for each radial position is a previously obtained fixed value, it is difficult to adjust the track width according to the variation of the inclination of the spiral pattern for each head MH and each unit.

In the second method, the track width is adjusted by writing a predetermined data pattern in a region between spiral patterns 55 to detect a readable range of the data pattern (a usable stroke), and determining a track pitch based on the usable stroke to write a servo pattern 28. In the second method, because it is necessary to write a predetermined data pattern and to then read the written data pattern, it tends to take much time to adjust the track width.

In the third method, the track width is adjusted by writing a predetermined data pattern in a region between spiral patterns 55 to calculate a width of a write head or a read head, and determining a track pitch based on the width of the write head or the read head to write a servo pattern 28. In the third method, because it is necessary to write a predetermined data pattern and to read the written data pattern, it tends to take much time to adjust the track width.

The fourth method is a method of adjusting the spiral pattern 55 itself that serves as a reference for writing the servo pattern 28. In the fourth method, a spiral pattern 55 is written on the disk medium MD while adjusting the moving speed of the actuator of the STW such that the inclined angle is uniform at each radial position of the spiral pattern 55, transferring the disk medium MD from the STW to the disk device 100, and writing a servo pattern 28 on the disk medium MD by using the spiral pattern 55. In the fourth method, because the servo pattern 28 is written on the disk medium MD on the premise that the inclination of the spiral pattern 55 does not vary, it is difficult to adjust the track width to correspond to the variation of the inclination of the spiral pattern 55.

In the fifth method, a plurality of predetermined spiral patterns 55 are provided in order to adjust the track width. Then, a first spiral pattern 55 is written on one surface of the disk medium MD, a second spiral pattern 55 is written on the other surface of the disk medium MD, and from the plurality of spiral patterns 55, a spiral pattern 55 is selected which has an inclination that enables a servo pattern 28 having an optimum (servo) track width to be written. In the fifth method, because the servo pattern 28 is written on the disk medium MD on the premise that the inclination of the selected spiral pattern 55 does not vary, it is difficult to adjust the track width to correspond to the variation of the inclination of the spiral pattern 55.

In the first to fifth methods, it is considered that the adjustment of a track width according to an in-plane radial position is performed using a correction value determined based on a prior design specification. In the first to fifth methods, in a case where the track width is individually adjusted for each radial position, it is necessary to further record an auxiliary pattern for track width adjustment on one surface of the disk medium MD separately from a spiral pattern 55 and to perform a measurement. That is, because it is necessary to further record an auxiliary pattern for track width adjustment and to perform a measurement prior to writing a servo pattern 28, it tends to take much time to adjust the track width.

Further, in the first to fifth methods, in adjusting the track width, a gain of a control signal of the coarse motion actuator 2 (a gain applied to a control signal so as to generate a driving signal of the coarse motion actuator 2) varies at each radial position. However, a gain of a control signal of the fine motion actuator 7 (e.g., the extendable member MA) (i.e., a gain applied to a control signal to generate a driving signal of the fine motion actuator 7) is treated as not varying at each radial position. The premise that the gain of the control signal of the fine motion actuator 7 does not vary at each radial position is true under the implicit assumption that the detection sensitivity of the pattern serving as a reference for positioning on the disk medium MD does not vary at each radial position. That is, the gain is considered as not varying at each radial position because there is the implicit assumption that the gain of the control signal of the fine motion actuator 7 is unique for each head MH and the variation of the track width in the auxiliary servo pattern serving as the reference is ignorable.

However, when a servo pattern 28 is formed by SSW, the premise that the detection sensitivity of the pattern is uniform at any radial position is violated in the case where the detection sensitivity varies at each radial position of an auxiliary servo pattern (e.g., a spiral pattern 55). The non-uniformity of the detection sensitivity affects not only the deviation of the track width, but also a positioning control performed using the fine motion actuator 7 during SSW. In order to eliminate the non-uniformity, it is necessary to measure the detection sensitivity of a pattern according to a radial position for each head MH (for each recording surface) of the disk device 100, and to record a servo pattern 28 at a feeding pitch corresponding to the variation of the detection sensitivity.

That is, through investigations, new findings have been found that the variation of the inclination of a spiral pattern at each radial position with respect to the circumferential direction of a disk medium MD may be indirectly known by measuring a gain of a control signal of the fine motion actuator 7 at each radial position of the head MH on the disk medium MD, and knowing a variation in the measurement value of the gain.

Thus, in the manufacturing of a disk device 100 according to the present embodiment, a gain of a control signal of the fine motion actuator 7 is measured at each radial position to calculate a gain correction value according to the measured value, and a track is formed after the track width is corrected with an adjustment amount according to the gain correction value, thereby reducing the variation of a track width due to the variation of an auxiliary servo pattern (e.g., the variation of the inclination of a spiral pattern 55 with respect to the circumferential direction of the disk medium MD).

Specifically, in the disk device 100, a function of measuring a gain of a control signal of the fine motion actuator 7 at each radial position and a positioning control system that uses the gain are implemented. Further, in the disk device 100, a function is implemented in which the feeding width of the head MH during SSW is corrected at each radial position by normalizing the gain obtained at each radial position of the fine motion actuator 7 within the same head MH, and considering the variation of the inclination of the spiral pattern 55 as indicating the variation in a gain of the control signal of the fine motion actuator 7. In this manner, the non-uniformity of the track width according to the in-plane variation of the inclination of the spiral pattern 55 may be corrected. That is, the track width of each radial position is adjusted during the recording of a servo pattern by using the fact that the gain correction value of the control signal of the fine motion actuator 7 depends on the inclination of an auxiliary servo pattern or the like. In that event, because an auxiliary servo pattern for track formation (e.g., the spiral pattern 55) may also be used as a pattern for track width adjustment, it is not necessary to additionally record an auxiliary pattern for track width adjustment on the disk medium MD in addition to the auxiliary servo pattern.

Figure 4:
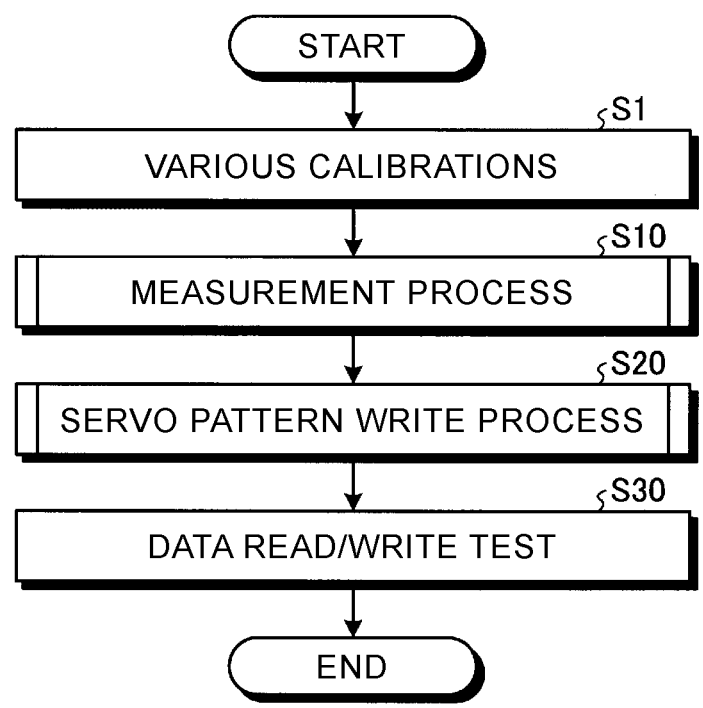
FIG. 4 is a flowchart illustrating a disk device manufacturing method according to the embodiment.

Next, a method of manufacturing a disk device 100 will be described with reference to FIG. 4. FIG. 4 is a flowchart illustrating a method of manufacturing the disk device 100 according to an SSW method as an example of the method of manufacturing the disk device 100. More specifically, in the method of manufacturing the disk device 100, a servo pattern 28 is written on a disk medium MD. For example, in the SSW method, an auxiliary servo pattern is written on a disk medium MD by an STW, and then a plurality of disk media MD are mounted on the case 1 (see FIG. 1). In addition, as illustrated in FIG. 4, the controller 17 performs various calibrations for the SSW by performing a positioning control or the like by using the auxiliary servo pattern while moving the heads MH from the inner circumference side to the outer circumference side (S1). Then, the controller 17 executes a measurement process for measuring a gain of a control signal of the fine motion actuator 7 at each radial position by using the auxiliary servo pattern (S10). The controller 17 performs a servo pattern write process to write a servo pattern 28 (see the dotted lines in FIG. 3) on the servo regions of the plurality of disk media MD while moving the heads MH by a predetermined pitch from the inner circumference side to the outer circumference side using the auxiliary servo pattern (S20). This causes the servo pattern 28 to be recorded on substantially the entire surface of each of the disk media MD. In addition, the controller 17 writes data in each track while performing the positioning control of each head MH using the servo pattern 28, and determines whether the written data is properly readable (whether the servo pattern 28 is properly written). That is, the controller 17 performs a data read/write test (S30). In addition, the determination of the quality of the servo patterns may be performed using a method that is different from S30.

Figure 5:
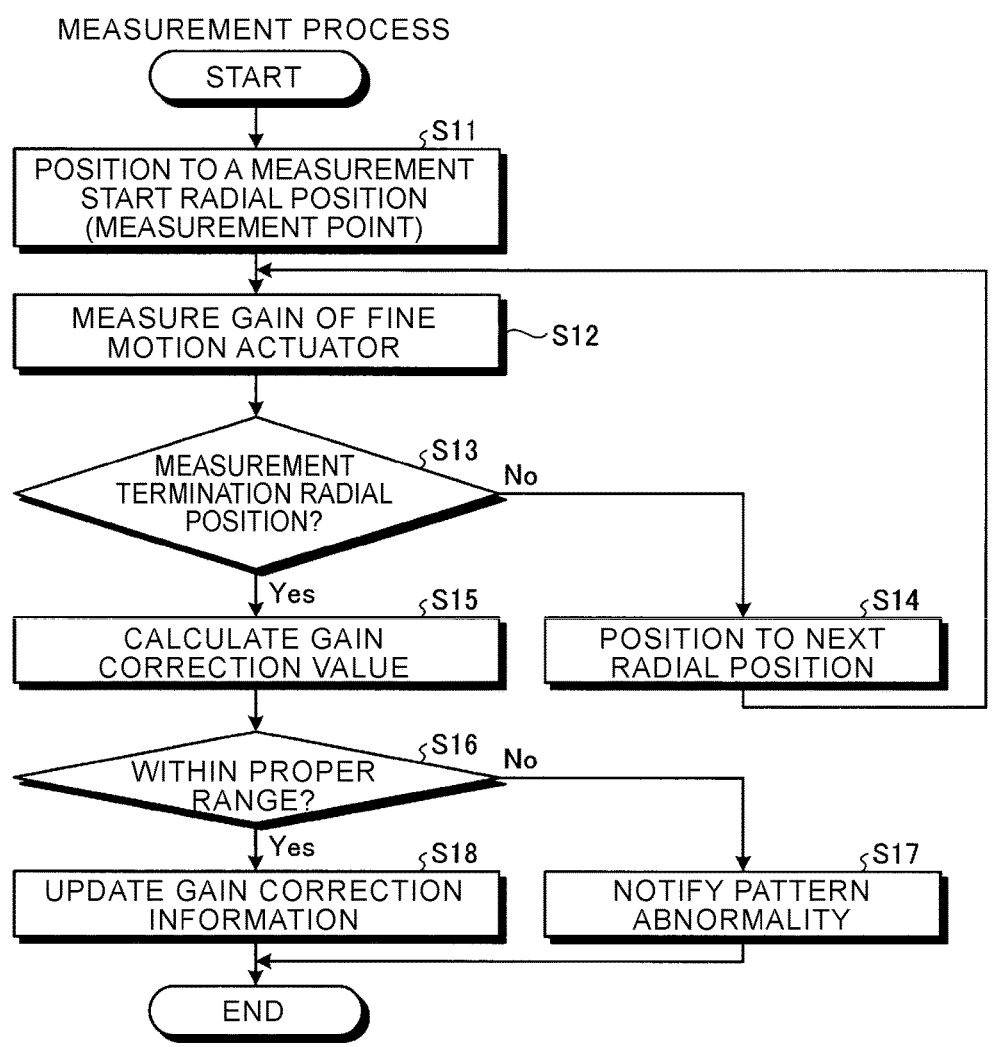
FIG. 5 is a flowchart illustrating a measurement process in the embodiment.

Next, details of the measurement process (S10) will be described with reference to FIG. 5. FIG. 5 is a flowchart illustrating the details of the measurement process (S10).

The coarse motion actuator 2 (the VCM 4) has a torque constant that varies at each radial position, and a gain of a control signal which varies at each radial position, that is, the gain of the control signal has a radial position dependency. Thus, a gain correction value may be calculated for each radial position. The gain correction value of the VCM 4 in the coarse motion actuator 2 may be calculated for each radial position of the disk medium MD due to the radial position dependency, and stored in a management information storage region of the disk medium MD or in the nonvolatile memory 18 in the form of a table or the like.

Meanwhile, for the fine motion actuator 7 (extendable member MA), a gain, which does not depend on a radial position, may be relatively and differently measured at each radial position due to the influence of the variation of the inclination of an auxiliary servo pattern (e.g., the spiral pattern 55) with respect to the circumferential direction of the disk medium MD. Thus, the gain correction value may be calculated for each radial position. The gain correction value of the fine motion actuator 7 may be calculated for each radial position of the disk medium MD, and stored in the management information storage region of the disk medium MD or in the nonvolatile memory 18 in the form of a table or the like. That is, in the disk device 100, the variation of the inclination of an auxiliary servo pattern is indirectly observed through the variation of a gain measurement value based on a gain that does not have radial position dependency.

Specifically, as illustrated in FIG. 5, the disk device 100 performs a control to position the head MH to a measurement start radial position (a measurement point) using an auxiliary servo pattern (e.g., the spiral pattern 55) (S11).

When the head MH is controlled to be positioned to the measurement point, the disk device 100 measures a gain of a control signal of the fine motion actuator 7 (S12). The gain may be measured for each of the zones provided in the form of concentric circles on the disk medium MD and averaged within the zones.

The disk device 100 may estimate (measure) a gain of a control signal of the fine motion actuator 7 by removing the gain of the coarse motion actuator 2 from a combined gain for the coarse motion actuator 2 and the fine motion actuator 7. This measurement process by the disk device 100 may be performed as illustrated in FIGS. 6A and 6B. FIGS. 6A and 6B are views illustrating a control operation in the measurement process (S12). When a gain measurement value is obtained, the disk device 100 holds the gain measurement value to correspond to a radial position of the head MH.

For example, a configuration for the control operation of the measurement process in the disk device 100 may be equivalently illustrated by function blocks as illustrated in FIGS. 6A and 6B. In FIGS. 6A and 6B, an adder 173 corresponds to a part of the head MH, the head amplifier 12, and the controller 17 (see FIG. 1). Each of a subtractor 172 and signal sources 177 and 178 corresponds to a part of the controller 17. A servo controller 171 corresponds to a part of the controller 17 and the control signal generating circuit 13b (see FIG. 1). A variable amplifier 175 corresponds to the coarse motion control circuit 13c (see FIG. 1). A variable amplifier 176 and a switch 174 correspond to the fine motion control circuit 13d (see FIG. 1).

In S12, the control operation of the control system illustrated in FIG. 6A and the control operation of the control system illustrated in FIG. 6B may be sequentially performed for each head MH.

In the control operation of the control system illustrated in FIG. 6A, a gain of the control system according to a gain of a control signal of the coarse motion actuator 2 (the VCM 4) is measured. That is, in order to operate the coarse motion actuator 2 without operating the fine motion actuator 7, the switch 174 blocks the input side of the fine motion actuator 7. In this state, a sinusoidal reference signal (which is the target position signal) r is supplied from the signal source 177 to the subtractor 172, and a position signal y of the head MH is supplied from the adder 173 to the subtractor 172. The subtractor 172 subtracts the position signal y from the reference signal r, and supplies a subtraction result to the servo controller 171 as a position error e. The servo controller 171 calculates an operation amount corrected such that the position error e comes close to zero for the operation amount of the actuator 9. Based on the operation amount of the actuator 9, the servo controller 171 calculates the operation amount u1 of the coarse motion actuator 2, and supplies the operation amount u1 to the variable amplifier 175. Further, the servo controller 171 calculates the operation amount u2 of the fine motion actuator 7, and supplies the operation amount u2 to the variable amplifier 176. The variable amplifier 175 generates a driving signal s1 (e.g., a driving current of the VCM 4) according to the operation amount u1, and supplies the driving signal s1 to the coarse motion actuator 2. The adder 173 adds a positional displacement amount by the coarse motion actuator 2 (a displacement amount corresponding to the driving signal s1) and a positional displacement amount by the fine motion actuator 7 (here, zero) to the last position of the head MH, and outputs the adding result as the position y of the head MH after the displacement.

In this case, assuming that a sensitivity function of the coarse motion actuator 2 (the VCM 4) is Cvcm, and a plant characteristic of the coarse motion actuator 2 (the VCM 4) is Pvcm, the controller 17 observes a vibration amplitude $\Delta r$ of the reference signal r and a vibration amplitude $\Delta y$ of the position signal y, and calculates a gain ($=\Delta y/(\Delta r)$) of the control system which is represented by the following Equation (1).

$$\Delta y/(\Delta r)=1/(1+Cvcm \times Pvcm) \qquad (1)$$

In the control operation of the control system illustrated in FIG. 6B, a measurement is made on a gain of the control system which is obtained by combining a gain of a control signal of the coarse motion actuator 2 (the VCM 4) and a gain of a control signal of the fine motion actuator 7 (the extendable member MA). That is, in order to operate the fine motion actuator 7, the switch 174 electrically connects the input side of the fine motion actuator 7 to the signal source 178. In this state, the operation similar to that in FIG. 6A is performed, and a sinusoidal reference signal r2 is supplied to the fine motion actuator 7 from the signal source 178. The excitation frequency in the reference signal r2 is sufficiently lowered relative to the main resonance frequency of the extendable member MA. The adder 173 adds a positional displacement amount by the coarse motion actuator 2 (i.e., a displacement amount corresponding to the driving signal s1) and a positional displacement amount by the fine motion actuator 7 (i.e., a displacement amount corresponding to the reference signal r2) to the last position of the head MH, and outputs the adding result as the position y of the head MH after the displacement.

In this case, assuming that a plant characteristic of the fine motion actuator 7 (the extendable member MA) is Pma, the controller 17 observes a vibration amplitude $\Delta r2$ of the reference signal r2 and a vibration amplitude $\Delta y$ of the position signal y, and calculates a gain ($=\Delta y/(\Delta r2)$) which is represented by the following Equation (2).

$$\Delta y/(\rightarrow r2)=Pma/(1+Cvcm \times Pvcm) \qquad (2)$$

In addition, Equation (3) is derived from Equations (1) and (2).

$$Pma=\{\Delta y/(\Delta r2)\}/\{\Delta y/(\Delta r)\} \qquad (3)$$

That is, as represented by Equation (3), the controller 17 calculates a gain of a control signal (i.e., a plant characteristic) Pma of the fine motion actuator 7 (the extendable member MA) by dividing the gain measured in FIG. 6B by the gain measured in FIG. 6A. This enables the measurement of a gain of a control signal of the fine motion actuator 7 (the extendable member MA) at an excitation frequency. This gain includes the detection sensitivity of a pattern that serves as a reference for positioning.

Referring back to FIG. 5, when the measurement of the gain of the control signal of the fine motion actuator 7 (S12) is completed, the disk device 100 determines whether the current radial position of the head MH is a measurement termination radial position (i.e., the last measurement point) (S13).

When it is determined that the current radial position is not the measurement termination radial position (No in S13), the disk device 100 performs a control to position the head MH to the next radial position (measurement point) (S14), and returns the process to S12.

Figure 7:
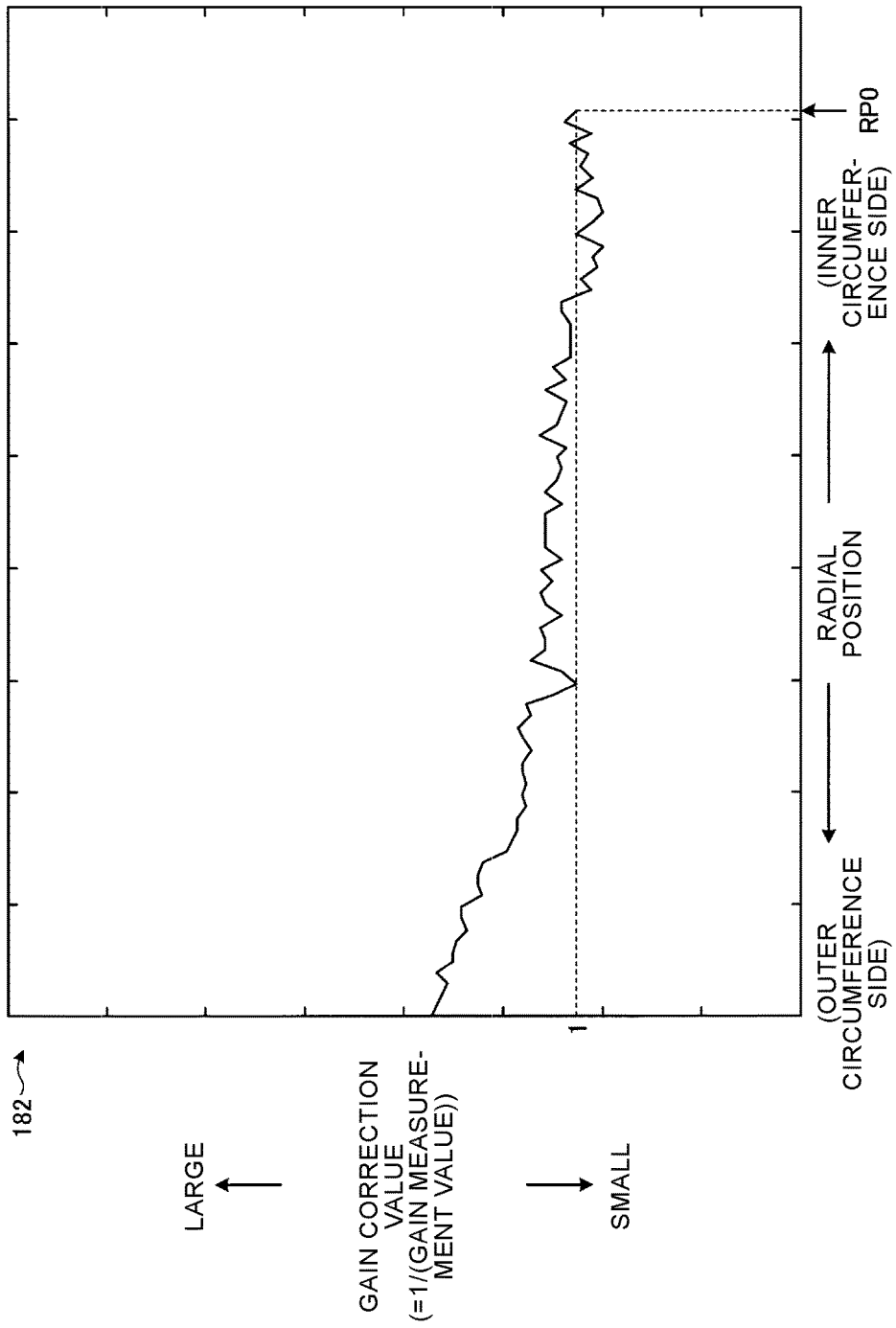
FIG. 7 is a view illustrating gain correction information obtained by the measurement process in the embodiment.

When it is determined that the current radial position is the measurement termination radial position (Yes in S13), the disk device 100 calculates a gain correction value based on the measurement result of S12 (S15). The gain correction value corrects a gain of a control signal of the fine motion actuator 7 for each radial position uniformly. For example, the disk device 100 may calculate the reciprocal of the gain measurement value held to correspond to a radial position in S12 as a gain correction value for the radial position. For example, as illustrated in FIG. 7, the disk device 100 may calculate a gain correction value for each radial position, and obtain gain correction information 182 in which an identifier, a radial position, and a gain correction value of a head MH are associated with each other with respect to a plurality of radial positions. FIG. 7 is a view illustrating the gain correction information 182 obtained in the measurement process. In this case, the gain correction value is a value for relative correction, and may be normalized. For example, the disk device 100 may normalize gain correction values at respective radial positions with a gain correction value at the innermost circumferential position RP0 (the innermost circumferential position 56b illustrated in FIG. 3) so as to obtain the gain correction information 182 as illustrated in FIG. 7. In FIG. 7, for example, the vertical axis represents a normalized gain correction value, and the horizontal axis represents a radial position (measurement zone number). The numbers of tracks for respective zones may be the same as each other. In FIG. 7, the gain correction value for the innermost circumferential position RP0 is "1."

Referring back to FIG. 5, the disk device 100 determines whether gain correction values at respective radial positions, which are obtained in S15, are included within a proper range (S16).

When it is determined that one or more gain correction values are out of the proper range among the gain correction values at respective radial positions (No in S16), the disk device 100 determines that the auxiliary servo pattern is abnormal, and notifies the same (S17). The notification of the abnormality of the auxiliary servo pattern may be performed either by visual means (e.g., lighting a lamp such as an LED) or by acoustic means (e.g., ringing a buzzer). This may prevent a post-process from being performed on an abnormal disk device 100.

When it is determined that all the gain correction values at respective radial positions are within the proper range (Yes in S16), the disk device 100 may update the gain correction information 182 by overwriting and storing the obtained gain correction information 182 in the management information storage region of the disk medium MD or the nonvolatile memory 18 in the form of a table or the like (S18). Further, the gain correction information 182 may be information in which an identifier, a radial position, and a gain correction value of the head MH are associated with each other, and may be represented, for example, in the form of a function such as an equation.

Figure 8:
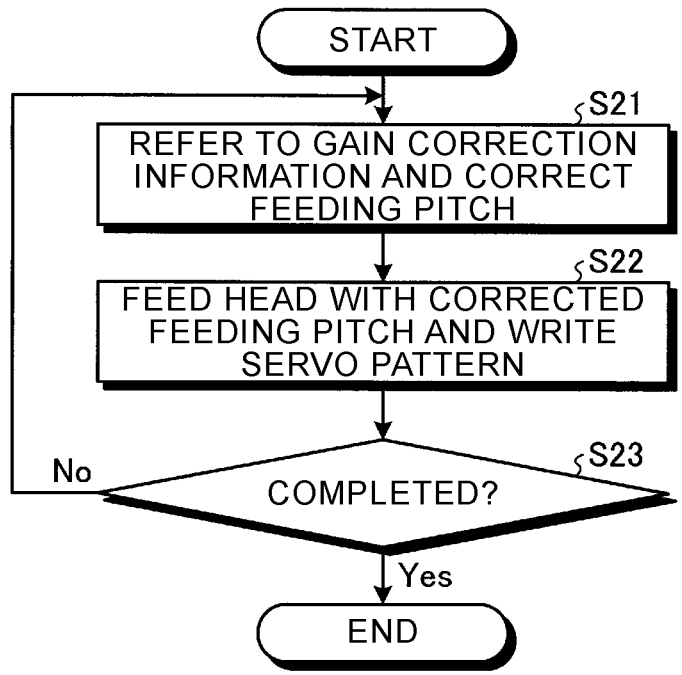
FIG. 8 is a flowchart illustrating a servo pattern write process in the embodiment.

Next, details of the servo pattern write process S20 will be described with reference to FIG. 8. FIG. 8 is a flowchart illustrating the details of the servo pattern write process S20.

In the servo pattern write process S20, the disk device 100 positions a head MH for each of plural radial positions and adjusts the track width while using an auxiliary servo pattern (e.g., the spiral pattern 55) according to a gain correction value for each radial position which is calculated in the measurement process S10. That is, the disk device 100 may access the management information storage region of the disk medium MD or the nonvolatile memory 18 to refer to the gain correction information 182, and acquire a gain correction value that corresponds to an identifier of a head MH that is to write the servo pattern 28 and the current radial position of the head MH. The disk device 100 calculates an adjustment amount of the track width according to the acquired gain correction value, and corrects the feeding pitch of the head MH from a reference feeding pitch to correspond to the adjustment amount (S21). This enables the disk device 100 to correct a feeding pitch to be controlled in such a manner that the influence of the variation of the inclination of the auxiliary servo pattern with respect to the circumferential direction of the disk medium MD at each radial position is reduced, and thus the practical feeding pitch is made to be uniform at each radial position. The reference feeding pitch may be about half the reference track width.

Figure 9:
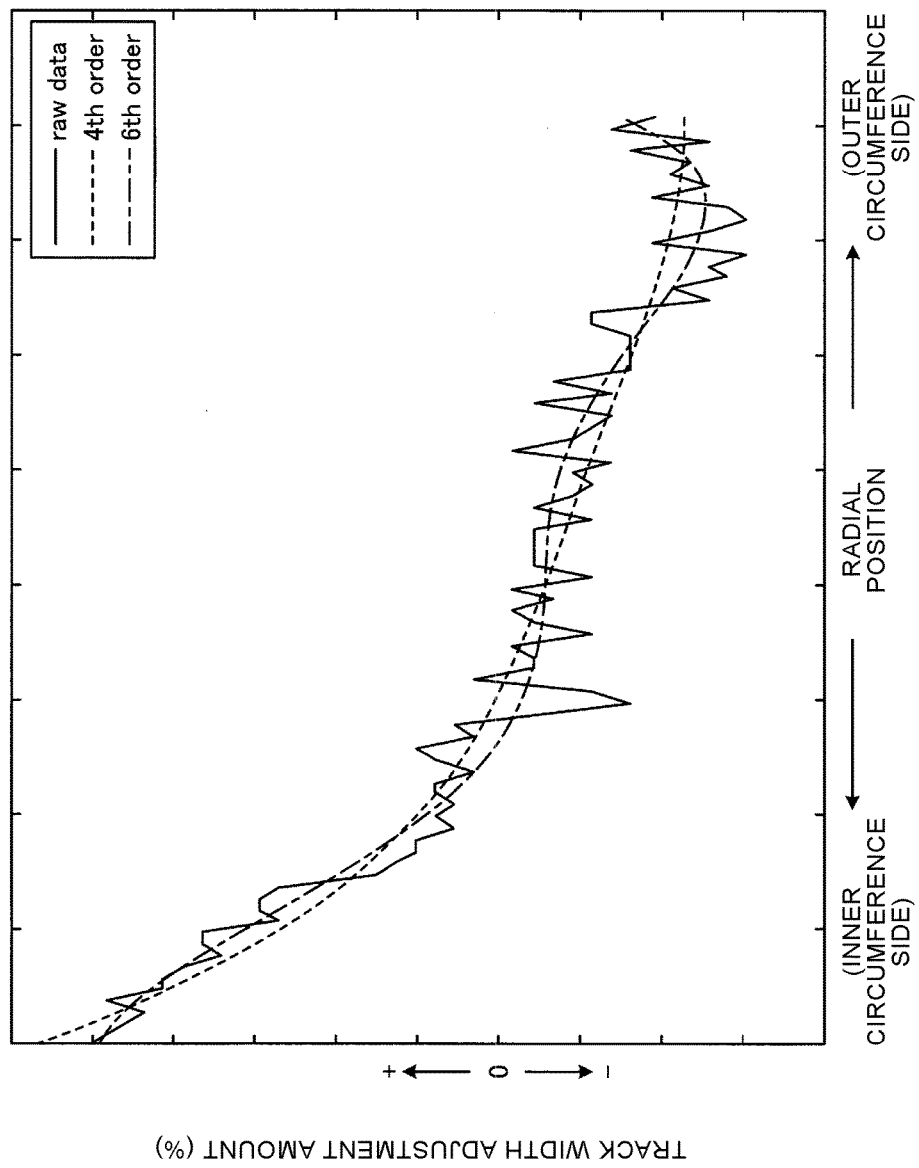
FIG. 9 is a view illustrating an adjust amount of a track width based on gain correction information in the embodiment.

The disk device 100 may calculate an adjustment amount of a track width as illustrated in FIG. 9 according to the gain correction information 182 illustrated in FIG. 7. In FIG. 9, the vertical axis represents an adjustment amount of a track width (e.g., an adjustment rate for the reference track width (%)), and the horizontal axis represents a radial position (e.g., a measurement zone number). The number of tracks in each zone may be the same. The disk device 100 may calculate, for each radial position, an adjustment rate for the reference track width (%) by multiplying a normalized gain correction value in the gain correction information 182 by a predetermined coefficient.

Figure 10:
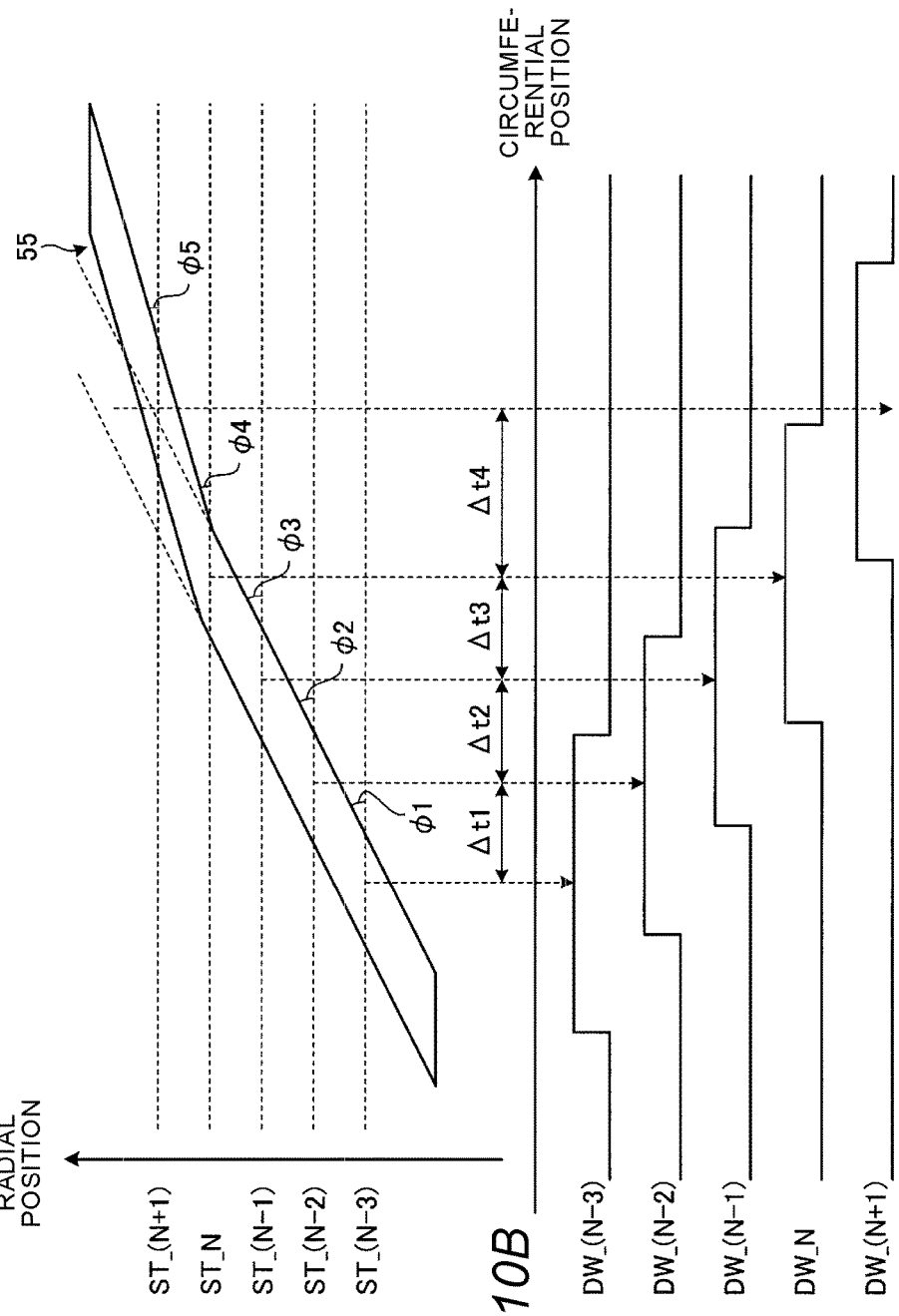
FIGS. 10A and 10B are views illustrating a track width adjustment operation in the embodiment.

In a case of a control system in which the head MH is subjected to a positioning control when the spiral pattern 55 is detected while a spiral detection window DW is opened, the timing of opening the spiral detection window DW may be adjusted, as illustrated in FIGS. 10A and 10B. FIGS. 10A and 10B are views illustrating a control operation of a servo pattern write process. The spiral detection window DW is in the opened state in a period where the signal level is in expected to be at an active level, and in the closed state in a period where the signal level is expected to be in a non-active level.

FIG. 10A is a view illustrating radial and circumferential positions of a disk medium MD of a head MH controlled by the disk device 100 (in particular, the controller 17). In FIG. 10A, each step ST_(N−3), ST_(N−2), ST_(N−1), ST_N, ST_(N+1) indicates a radial position which becomes a target where a servo pattern 28 is to be written. FIG. 10A illustrates an example in which the inclination of the spiral pattern 55 varies between step ST_N and step ST_(N+1). Assuming that the inclinations of the spiral pattern 55 with respect to the circumferential direction at respective steps ST_(N−3), ST_(N−2), ST_(N−1), ST_N, ST_(N+1) are 01, 02, 03, 04, and 05, respectively, the following Equation (4) is established.

$$\phi1 \approx \phi2 \approx \phi3 > \phi4 \approx \phi5 \tag{4}$$

FIG. 10B is a view illustrating signal waveforms of spiral detection windows DW corresponding to FIG. 10A. The spiral detection windows DW_(N−3), DW_(N−2), DW_(N−1), DW_N, and DW_(N+1) correspond to steps ST_(N−3), ST_(N−2), ST_(N−1), ST_N, and ST_(N+1), respectively. In the example in FIG. 10A, because the inclination becomes gentle between step ST_N and step ST_(N+1), the radial feeding pitches may be made to be approximately equal to each other as a result of increasing the time intervals between centers of the spiral detection windows DW. Assuming that the time intervals between centers of between the spiral detection windows DW_(N−3), DW_(N−2), DW_(N−1), DW_N, DW_(N+1) are Δt1, Δt2, Δt3, and Δt4, respectively, the following Equation (5) is established.

$$\Delta t1 \approx \Delta t2 \approx \Delta t3 < \Delta t4 \tag{5}$$

That is, a positioning control system is operated to adjust the centers of the spiral detection windows DW. For that reason, by changing the time intervals in generating timing of the spiral detection windows DW, the change of a target position is enabled such that the feeding pitch of a practical head MH can be made to be uniform at each radial position. When there is a restriction in a timing resolution of the spiral detection window DW, an adjustment of a fine feeding pitch is enabled by performing positioning not at the center of the spiral detection window DW, but with a slight offset from the center of the spiral detection window DW.

For example, the disk device 100 calculates changes in the time intervals in generating the timing of the spiral detection window DW based on an adjustment amount of a track width calculated as illustrated by a solid line in FIG. 9 according to the gain correction information 182 illustrated in FIG. 7. This enables a positioning control to be performed such that the feeding pitch of the head MH can be made to be uniform at each radial position.

Referring back to FIG. 8, the disk device 100 feeds the head MH with a corrected feeding pitch, and writes the servo pattern 28 on a disk medium MD using the head MH (S22). That is, because the servo pattern 28 is written on the disk medium MD in the state where the positioning control is performed such that the feeding pitch of the head MH is made to be uniform at each radial position, the track width defined on the disk medium MD may be made to be uniform at each radial position.

The disk device 100 repeats the processes of S21 to S22 until servo patterns 28 (see FIG. 3) are written in all the servo regions in the disk medium MD (No in S23). When the write of the servo patterns 28 is completed in the entire servo region in the disk medium MD (Yes in S23), the disk device 100 terminates the process.

Thus, as described above, in the manufacturing method of a disk device 100 according to the present embodiment, a gain of a control signal of the fine motion actuator 7 is measured at each radial position to calculate a gain correction value according to the measured value, and a servo pattern 28 is written after the track width is corrected with an adjustment amount according to the gain correction value. Thus, the servo pattern 28 may be formed on the disk medium MD while reducing the influence of the variation of an auxiliary servo pattern (e.g., the variation of the inclination of the spiral pattern 55 with respect to the circumferential direction of the disc medium MD), and the variation of a track width, which is caused by the variation of the auxiliary servo pattern, may be reduced. That is, the track width of each track, which is defined by a servo pattern 28 in a disk medium MD, may be made to be uniform over a plurality of radial positions.

Further, an approximation process for a gain or a gain correction value may be performed in order to reduce the influence of the variation in a gain measurement. For example, the disk device 100 (in particular, the controller 17) may calculate an adjustment rate (%) for a reference track width by generating a first approximate curve for a variation of gains at a plurality of radial positions, calculating reciprocals of values in the first approximate curve as gain correction values, normalizing the gain correction values, and multiplying the normalized gain correction values by a predetermined coefficient. Alternatively, for example, the disk device 100 (in particular, the controller 17) may calculate an adjustment rate (%) for a reference track width by calculating a reciprocal of a gain at each radial position, generating a second approximate curve for a variation of reciprocals of gains at a plurality of radial positions, employing values on the second approximate curve as gain correction values, normalizing the gain correction values, and multiplying the normalized gain correction values by a predetermined coefficient. In a case where the first approximate curve or the second approximate curve is a quarternary approximate curve, the adjustment rate (%) for the reference track width for each radial position becomes as illustrated by a broken line in FIG. 9. In a case where the first approximate curve or the second approximate curve is a sixth-order approximate curve, the adjustment rate (%) for the reference track width for each radial position becomes as illustrated by a one-dot chain line in FIG. 9.

Further, in the measurement process illustrated in FIG. 5, the update of the gain correction information 182 (S18) may be performed before performing the process of S16 and after calculating a gain correction value (S15).

Further, the information stored in the disk medium MD or the nonvolatile memory 18 in order to adjust a track width may be gain information in place of the gain correction information 182. In this case, in the measurement illustrated in FIG. 5, S15 to S18 may be omitted, and whenever a gain measurement value of each radial position is added in step S12, the gain information may be additionally updated and stored in the disk medium MD or the nonvolatile memory 18. Further, when a feeding pitch is corrected in the servo pattern write process illustrated in FIG. 8, a gain for the radial position thereof may be obtained from the gain information, a gain correction value may be calculated according to the gain, an adjustment amount of a track width may be calculated according to the gain correction value, and a feeding pitch when writing a servo pattern may be calculated according to the adjustment amount of the track width.

Further, the gain correction information 182 (see FIG. 7) may be deleted from the disk medium MD or the nonvolatile memory 18 after the adjustment of a track width defined on the disk medium MD in the manufacturing method of the disk device 100 is completed, but may remain without being deleted. That is, the gain correction information 182 may be used as information for a positioning control in the disk device 100 after shipping.

Figure 11:
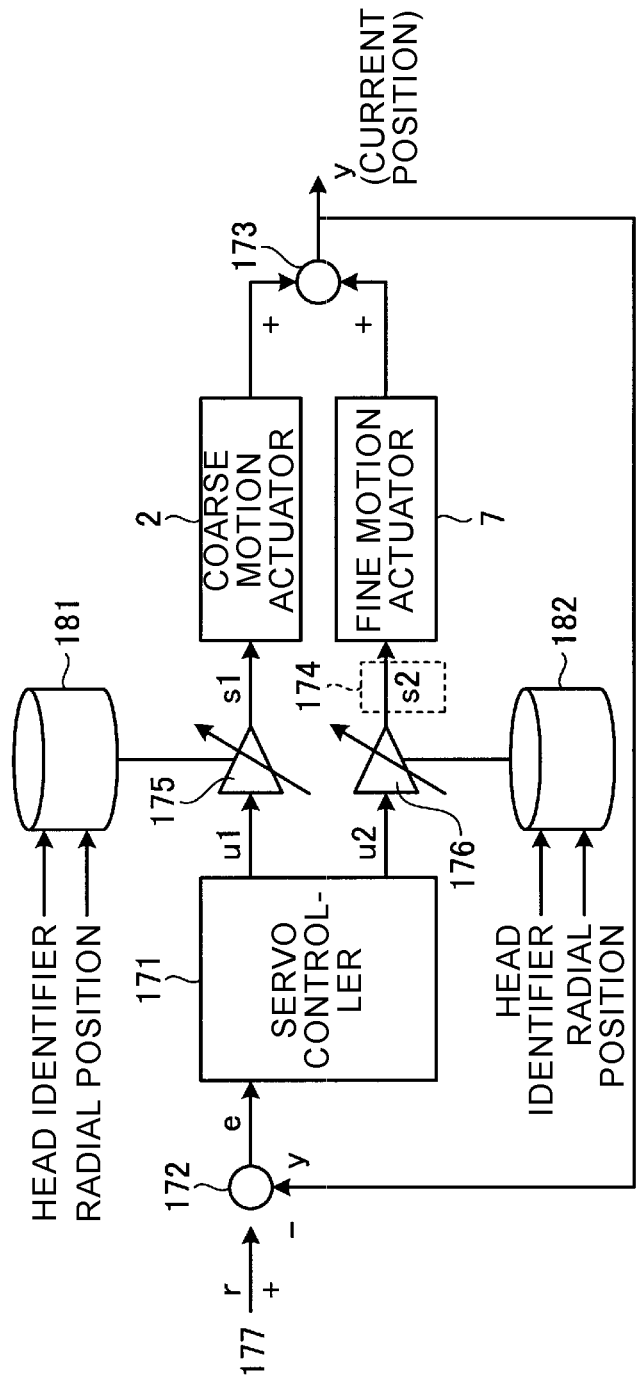
FIG. 11 is a view illustrating a control operation in a read/write process in a modification of the embodiment.

For example, in the measurement process illustrated in FIG. 5, the gain correction information 181 for the coarse motion actuator 2 is obtained, the gain correction information 182 for the fine motion actuator 7 is obtained, and the disk device 100 at the time of shipping may be configured as illustrated in FIG. 11. FIG. 11 is a view illustrating a control operation of a read/write process. That is, in order to operate each of the coarse motion actuator 2 and the fine motion actuator 7 according to the servo controller 171, the switch 174 electrically connects the input side of the fine motion actuator 7 to the output side of the variable amplifier 176. In the configuration illustrated in FIG. 11, the gain correction information 181 for the coarse motion actuator 2 and the gain information 182 for the fine motion actuator 7 may be used in common, and may be configured as gain correction information in which a gain correction value of the coarse motion actuator 2 and a gain correction value of a control signal of the fine motion actuator 7 are associated with each other for each combination of an head identifier and a radial position.

After shipping, the disk device 100 may operate as illustrated in FIG. 12. FIG. 12 is a flowchart illustrating a control operation in a read/write process. In the read/write process, the disk device 100 reads a servo signal from a servo pattern 28 of a disk medium MD, and demodulates the read servo signal (S41) to generates a position signal y. The disk device 100 (the controller 17) determines a control position in the read/write process (S42), and generates a target position signal r corresponding to the control position. The disk device 100 (controller 17) corrects the control position with reference to the gain correction information 181, 182 (S43). For example, the target position signal r is supplied from the signal source 177 (the controller 17) to the subtractor 172, and a position signal y of the head MH is supplied from the adder 173 to the subtractor 172. The subtractor 172 subtracts the position signal y from the target position signal r, and supplies a subtraction result to the servo controller 171 as a position error e. The servo controller 171 calculates an operation amount corrected such that the position error e comes close to zero for the operation amount of the actuator 9. Based on the operation amount of the actuator 9, the servo controller 171 calculates the operation amount u1 of the coarse motion actuator 2, and supplies the operation amount u1 to the variable amplifier 175. Further, the servo controller 171 calculates the operation amount u2 of the fine motion actuator 7, and supplies the operation amount u2 to the variable amplifier 176. The controller 17 reads gain correction values according to a head identifier and a radial position of the head MH to be operated from the gain correction information 181, 182, and supplies the each of the gain correction values to the variable amplifiers 175, 176. The variable amplifier 175 performs a correction according to the gain correction value for the operation amount u1, generates a driving signal s1 (e.g., a driving current of the VCM 4) according to the corrected operation amount u1, and supplies the driving signal s1 to the coarse motion actuator 2. The variable amplifier 176 performs a correction according to the gain correction value for the operation amount u2, generates a driving signal s2 (e.g., a driving current of the extendable member MA) according to the corrected operation amount u2, and supplies the driving signal s2 to the fine motion actuator 7. This causes the disk device 100 to perform a positioning control for the head MH (S45). For example, the adder 173 adds a positional displacement amount by the coarse motion actuator 2 (a displacement amount corresponding to the driving signal s1) and a positional displacement amount by the fine motion actuator 7 (about zero) to the last position of the head MH, and outputs the adding result as the position y of the head MH after the displacement. Further, the disk device 100 reads/writes data with respect to the disk medium MD via the head MH (S46).

As described above, because the positioning control of a head MH is performed by adjusting a gain of a control signal of at least the fine motion actuator 7 in the two-stage actuator, the control precision in positioning may be improved compared to a case in which the gain of the control signal of the fine motion actuator 7 is not adjusted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for manufacturing a disk device, the method comprising:
   measuring a first gain of a control signal of a fine motion actuator while positioning a head to a first radial position of a disk medium using a coarse motion actuator but not the fine motion actuator, based on an auxiliary servo pattern recorded on the disk medium;
   measuring a second gain of a control signal of the fine motion actuator while positioning the head to a second radial position of the disk medium using the coarse motion actuator but not the fine motion actuator, based on the auxiliary servo pattern recorded on the disk medium; and
   determining gain correction values which are to be applied to a control signal for the fine motion actuator while performing servo pattern writing on the disk medium, based on the first and second gains.

2. The method according to claim 1, further comprising:
   calculating a first gain correction value for the first radial position based on the first gain; and
   calculating a second gain correction value for the second radial position based on the second gain.

3. The method according to claim 2, further comprising:
   positioning the head to the first radial position using the coarse motion actuator and the fine motion actuator while applying the first gain correction value to the control signal for the fine motor actuator, and writing the servo pattern on the disk medium while the head is positioned at the first radial position; and
   positioning the head to the second radial position using the coarse motion actuator and the fine motion actuator while applying the second gain correction value to the control signal for the fine motor actuator, and writing the servo pattern on the disk medium while the head is positioned at the first radial position.

4. The method according to claim 2, wherein the first and second gain correction values, when applied to the control signal for the fine motor actuator, causes the gain of the control signal of the fine motion actuator to be the same at the first radial position and at the second radial position.

5. The method according to claim 4, wherein the first gain correction value is a reciprocal of the first gain, and
   the second gain correction value is a reciprocal of the second gain.

6. The method according to claim 2, further comprising:
   generating information in which a radial position and a gain-related value are associated with each other at least for the first radial position and the second radial position, and storing the information,
   wherein the gain-related value includes the first gain and the second gain, or the first gain correction value and the second gain correction value.

7. The method according to claim 2, wherein the calculating the first gain correction value and the second gain correction value includes generating a curve that approximates a variation of the gains for the first radial position and the second radial position, and
   wherein the first gain correction value is a reciprocal of a value determined from the curve as corresponding to the first radial position, and the second gain correction value is a reciprocal of a value determined from the curve as corresponding to the second radial position.

8. The method according to claim 7, further comprising:
   generating information in which a radial position and a gain-related value are associated with each other for at least the first radial position and the second radial position, and storing the information in the disk medium or a nonvolatile memory,
   wherein the gain-related value includes the first gain and the second gain, the value corresponding to the first radial position and the value corresponding to the second radial position on the curve, or the first gain correction value and the second gain correction value.

9. The method according to claim 2, wherein the calculating the first gain correction value and the second gain correction value includes:

calculating a reciprocal of the first gain for the first radial position, calculating a reciprocal of the second gain for the second radial position, and generating a curve that approximates a variation of reciprocals of the gains at the first radial position and the second radial position, wherein the first gain correction value is a value determined from the curve as corresponding to the first radial position, and the second gain correction value is a value determined from the curve as corresponding to the second radial position.

10. The method according to claim 9, further comprising:

generating information in which a radial position and a gain-related value are associated with each other at least for the first radial position and the second radial position, and storing the information in the disk medium or a nonvolatile memory, wherein the gain-related value includes the first gain correction value and the second gain correction value, or the value corresponding to the first radial position and the value corresponding to the second radial position on the curve.

11. The method according to claim 2, further comprising:

determining whether the first gain correction value is included in a proper range;

determining whether the second gain correction value is included in the proper range; and determining that the auxiliary servo pattern is abnormal in a case where at least one of the first gain correction value and the second gain correction value is outside the proper range.

12. A disk device comprising:

a disk medium;

a coarse motion actuator;

a fine motion actuator supported on the coarse motion actuator, and configured to support a head;

a controller configured to:

measure a first gain of a control signal of the fine motion actuator while positioning the head to a first radial position of the disk medium using the coarse motion actuator but not the fine motion actuator, based on an auxiliary servo pattern recorded on the disk medium;

measure a second gain of a control signal of the fine motion actuator while positioning the head to a second radial position of the disk medium using the coarse motion actuator but not the fine motion actuator, based on the auxiliary servo pattern recorded on the disk medium; and determine gain correction values which are to be applied to a control signal for the fine motion actuator while performing servo pattern writing on the disk medium, based on the first and second gains.

13. The disk device according to claim 12, wherein the controller calculates a first gain correction value for the first radial position based on the first gain, and calculates a second gain correction value for the second radial position based on the second gain.

14. The disk device according to claim 13, wherein during servo pattern writing, the controller positions the head to the first radial position using the coarse motion actuator and the fine motion actuator while applying the first gain correction value to the control signal for the fine motor actuator, and writes the servo pattern on the disk medium while the head is positioned at the first radial position, and the controller positions the head to the second radial position using the coarse motion actuator and the fine motion actuator while applying the second gain correction value to the control signal for the fine motor actuator, and writes the servo pattern on the disk medium while the head is positioned at the first radial position.

15. The disk device according to claim 13, wherein the first and second gain correction values, when applied to the control signal for the fine motor actuator, causes the gain of the control signal of the fine motion actuator to be the same at the first radial position and at the second radial position.

16. The disk device according to claim 15, wherein the first gain correction factor is a reciprocal of the first gain, and the second gain correction factor is a reciprocal of the second gain.

17. The disk device according to claim 13, wherein the disk medium stores information in which a radial position and a gain-related value are associated with each other at least for the first radial position and the second radial position, and the gain-related value includes the first gain and the second gain, or the first gain correction value and the second gain correction value.

18. The disk device according to claim 13, further comprising:

a nonvolatile memory that stores information in which a radial position and a gain-related value are associated with each other at least for the first radial position and the second radial position, wherein the gain-related value includes the first gain and the second gain, or the first gain correction value and the second gain correction value.

19. The disk device according to claim 13, wherein the controller generates a curve that approximates a variation of the gains at the first radial position and the second radial position, the first gain correction value is a reciprocal of a value determined from the curve as corresponding to the first radial position, and the second gain correction value is a reciprocal of a value determined from the curve as corresponding to the second radial position.

20. The disk device according to claim 13, wherein the controller calculates a reciprocal of the first gain for the first radial position, calculates a reciprocal of the second gain for the second radial position, and generates a curve that approximates a variation of the reciprocals of the gains at the first radial position and the second radial position, the first gain correction value is a value determined from the curve as corresponding to the first radial position, and the second gain correction value is a value determined from the curve as corresponding to the second radial position.

* * * * *